(12) United States Patent
Oberpriller

(10) Patent No.: US 6,655,701 B2
(45) Date of Patent: Dec. 2, 2003

(54) INFLATABLE TUBE SKI VEHICLE WITH STEERING MECHANISM

(75) Inventor: Barry G. Oberpriller, Leverett, MA (US)

(73) Assignee: Roto-ski, Inc., Leverett, MA (US)

( * ) Notice: Subject to any disclaimer, the term of this patent is extended or adjusted under 35 U.S.C. 154(b) by 0 days.

(21) Appl. No.: 09/915,037

(22) Filed: Jul. 25, 2001

(65) Prior Publication Data

US 2003/0020247 A1 Jan. 30, 2003

(51) Int. Cl.$^7$ .......................... B62B 17/00; B62B 19/00
(52) U.S. Cl. ...................... 280/21.1; 280/18.1
(58) Field of Search ................ 280/21.1, 18.1, 280/845, 28.11, 18; 188/8; 441/65, 66, 67

(56) References Cited

U.S. PATENT DOCUMENTS

| | | | | |
|---|---|---|---|---|
| 829,668 A | * | 8/1906 | Pinkham | .......................... 188/8 |
| 1,148,291 A | * | 7/1915 | Curwen | .......................... 188/8 |
| 1,288,843 A | * | 12/1918 | Currey | ........................... 188/8 |
| 1,475,529 A | * | 11/1923 | Aptowicz | ....................... 188/8 |
| 2,245,401 A | | 6/1941 | Hooker | |
| 2,353,501 A | * | 7/1944 | Redling | ..................... 280/21.1 |
| 3,479,046 A | | 11/1969 | Thompson | |
| 3,581,328 A | | 6/1971 | Smith | |
| 3,628,206 A | * | 12/1971 | Mecham | ........................... 9/11 |
| 3,632,124 A | * | 1/1972 | Cropp | .......................... 280/12 |
| 3,773,345 A | | 11/1973 | Mitchell | |
| 4,160,299 A | * | 7/1979 | Hilbern | .......................... 9/347 |
| 4,366,963 A | * | 1/1983 | Reeves et al. | ............ 280/12 B |
| 4,650,433 A | * | 3/1987 | Lee | ............................... 441/65 |
| 5,888,110 A | * | 3/1999 | Haller et al. | .................. 441/66 |

* cited by examiner

*Primary Examiner*—Brian L. Johnson
*Assistant Examiner*—G B Klebe
(74) *Attorney, Agent, or Firm*—Holland & Bonzagni, P.C.; Donald S. Holland; John A. Kramer

(57) ABSTRACT

An inflatable tube ski vehicle with steering mechanism comprises an inflated, torus-shaped tube or bladder and a ski insert disposed in the central opening of the bladder. The ski insert may be dish-shaped, or it may partially wrap around the top and/or bottom of the bladder. In either case, the ski vehicle has a steering/braking mechanism comprising left and right lever arms pivotally attached to and extending down through the ski insert. To turn, a rider simply pulls on one of the lever arms, causing a lower portion of the lever arm to extend past a bottom of the insert. To brake, both arms are pulled simultaneously. Because the ski vehicle is round and because the weight of the vehicle and rider are largely uniformly distributed over the center of the vehicle, a pivot or fulcrum point occurs directly under the rider's seat, affording a significant degree of control.

26 Claims, 9 Drawing Sheets

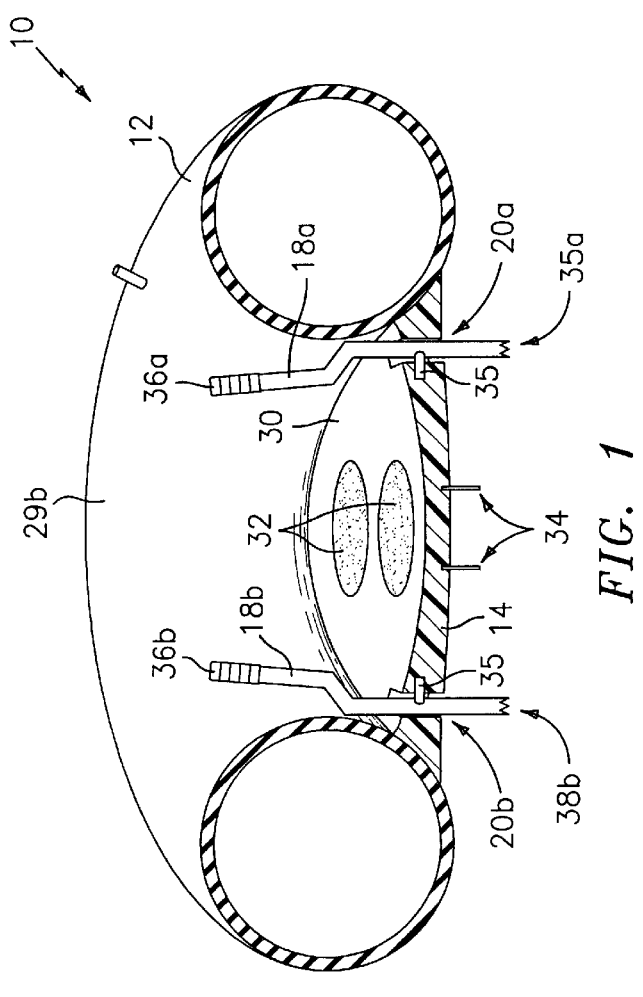
FIG. 1
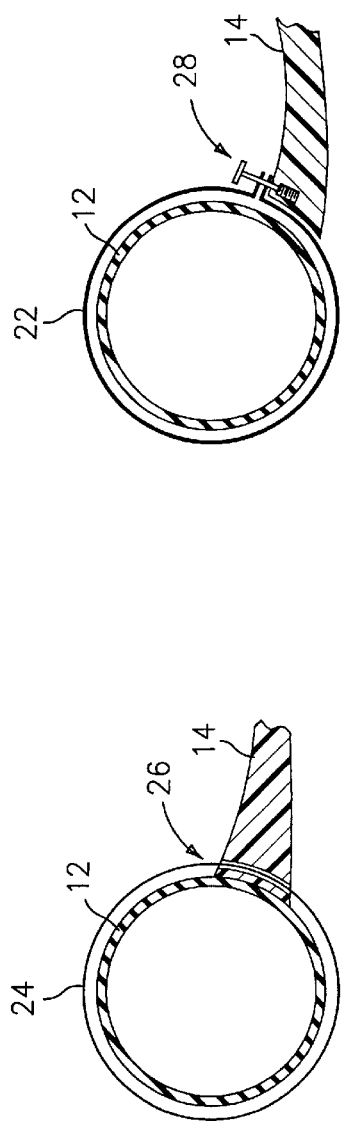
FIG. 5A
FIG. 5B

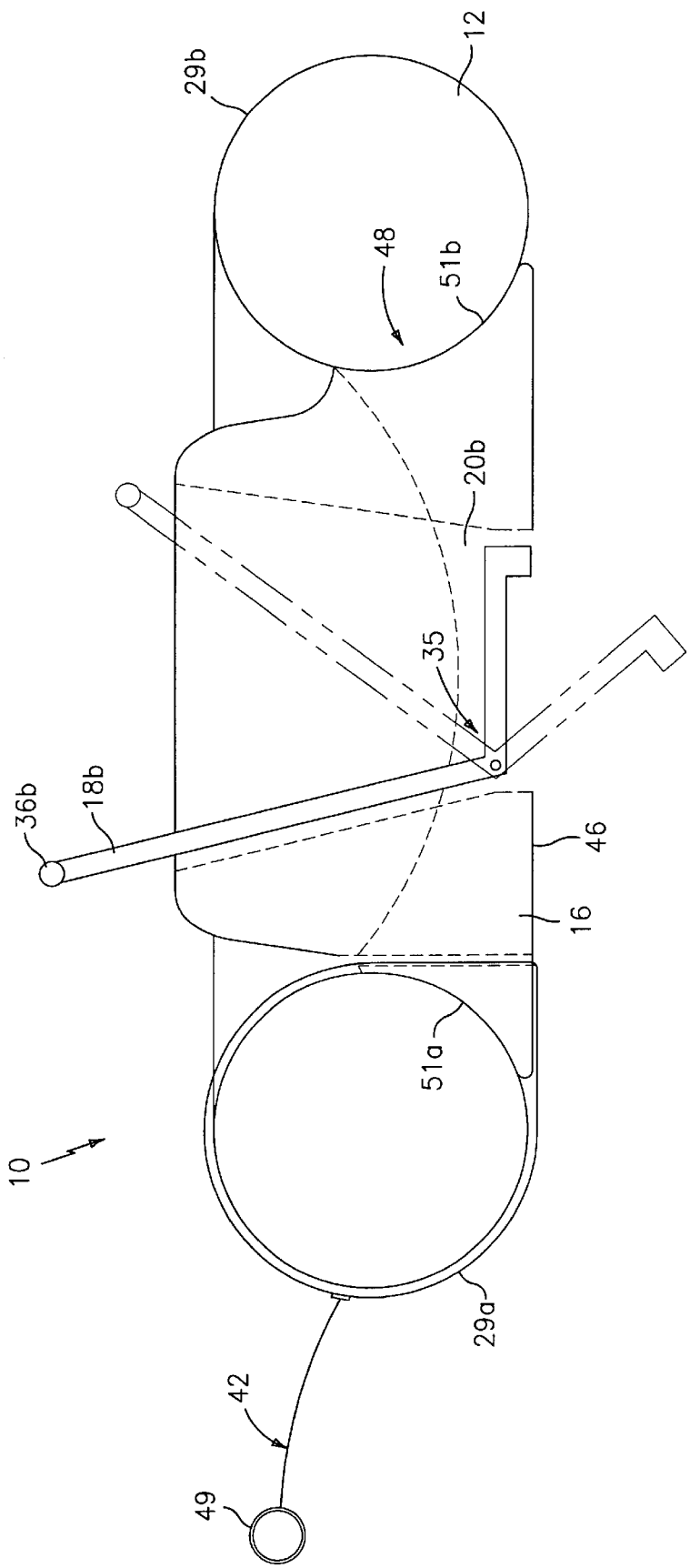

INFLATABLE TUBE SKI VEHICLE WITH STEERING MECHANISM

FIELD OF THE INVENTION

The present invention relates to devices for traveling in snow or water, and, more particularly, to un-powered devices for traveling down snow-covered slopes or behind boats.

BACKGROUND OF THE INVENTION

Where possible, e.g., in the northern latitudes, humans have long exploited the recreational possibilities of winter. Frozen ponds mean ice fishing, hockey, and ice skating. Snow covered trails mean snowmobiling and cross-country skiing. And snow covered slopes mean downhill skiing, snowboarding, tubing, and sledding. In fact, formal facilities (e.g., groomed slopes, chair lifts) for the latter have become so numerous in recent years that the opportunities for conveniently and inexpensively engaging in downhill winter sports have increased to unprecedented levels.

Unfortunately, however, many people either cannot or do not take part in downhill winter sports. This is because the sports oftentimes require expensive equipment, a high degree of skill, or both, and can be quite dangerous. Rental equipment may ease the bother of the former, but the latter two always remain a problem. Skiing, for example, can take years to learn well, and there are all too many unfortunate examples of fatal or debilitating accidents on the slopes.

Accordingly, many alternatives to the more skill-oriented and dangerous downhill winter sports have been proposed over the years. These have primarily taken the form of small, "gravity powered" vehicles such as sleds and inflated tubes. In particular, the latter have become quite popular at ski resorts, and basically mirror the idea of the simple sled: a person, sitting or lying on a tube, slides down a snow-covered hill in a straight path and in a more-or-less uncontrolled manner. Tubing is fun and economical, but suffers from a lack of directional control that makes it rather unappealing for those seeking a more "interactive," skiing-like experience. Additionally, this lack of control causes problems at resorts or other ski facilities. For example, tube runs must be properly groomed to ensure that people traveling downhill on the tubes go in the right direction, and resort personnel must be stationed at the top of the run to ensure that only one person goes down at a time (because the people using the tubes have no control and can only travel, more-or-less, in a straight line downhill).

Recognizing these problems, many "steerable" sleds have been proposed over the years. For example, U.S. Pat. No. 3,366,395 to Bjork ("Bjork") shows a three-runner sled whose single front runner can be turned via a pair of handlebars, and U.S. Design Pat. No. 316,234 to Mirisch, Sr. ("Mirisch, Sr.") shows a tray-like sled having a front steering member operated by a person's feet. Although these designs are theoretically functional, they demonstrate why steerable sleds have never really caught on in the marketplace. More specifically, many sleds simply do not work that well in varied snow conditions. For example, sleds with deep, blade-like runners, like the one in Bjork, are almost useless in loose powder conditions. Likewise, tray-like sleds, like the one in Mirisch, Sr., are only useful on packed slopes or trails. Additionally, even if these steerable sleds function in certain snow conditions, they rarely, if ever, provide an optimum, ski-like level of control. Typically, a user can only change the sled's general direction of travel, cannot make hard left or right turns, and has no effective means for braking. Further, many sleds can be heavy or awkward, making them impractical for use at ski facilities with chair lifts.

Accordingly, a primary object of the present invention is to provide an un-powered ski vehicle that operates well and is highly maneuverable in most snow conditions.

Another primary object of the present invention is to provide an un-powered ski vehicle that is compatible with chair lifts.

An additional primary object of the present invention is to provide an un-powered ski vehicle that has an effective braking mechanism.

SUMMARY OF THE INVENTION

An inflatable tube ski vehicle with steering mechanism comprises an air-inflated, torus-shaped tube or bladder and a ski insert positioned in the bladder's central opening. The ski insert can be dish-shaped, in which case it is attached to the underside of the bladder by way of straps or other mechanical fasteners. Alternatively, the ski insert can be contoured to partially wrap around the top and bottom of the bladder, like a tire rim, such that the ski insert is effectively attached to the bladder by way of an air lock seal. In either case, the ski vehicle is provided with a steering/braking mechanism comprising left and right, generally L-shaped lever arms pivotally attached to the ski insert near their midpoints. The lever arms pass through left and right side slots or openings provided in the ski insert, such that upper portions of the lever arms lie generally above the top of the ski insert, while lower portions of the lever arms lie below the top of the ski insert. Handles are attached to upper ends of the lever arms, while snow rakes, shaped for engaging snow, are attached to lower ends of the lever arms. The lever arms can be moved from a retracted position, wherein the snow rakes lie generally tucked up into the side slots, and to a deployed position, wherein the snow rakes extend significantly beyond the bottom of the ski insert for engaging snow. Also, two parallel runners are attached to the bottom of the ski insert.

To use the ski vehicle, a rider sits in the ski insert and draped over the bladder, with the rider's legs extending over the front of the vehicle. In this position, the rider can grasp the handles and travel downhill. With the lever arms in their retracted position, the snow rakes do not interfere with passing snow, and the vehicle travels straight downhill, as facilitated by the runners. To turn left or right, the rider simply pulls on the left or right lever arm, respectively, causing the applicable snow rake to extend down into the snow. To brake, both arms are pulled simultaneously. The harder the rider pulls on either lever arm alone (for steering), or both lever arms together (for braking), the more aggressively the vehicle turns or slows down, as applicable. Because the ski vehicle is round and the weight of the vehicle and rider are largely uniformly distributed over the center of the vehicle, and because the lever arms extend down through the central opening of the bladder, a pivot or fulcrum point occurs directly under the rider's seat, allowing the ski vehicle to make relatively tight turns.

BRIEF DESCRIPTION OF THE DRAWINGS

These and other features, aspects, and advantages of the present invention will become better understood with respect to the following description, appended claims, and accompanying drawings, in which:

FIG. 1 is a front cross-sectional view of an inflatable tube ski vehicle with steering mechanism according to the present invention;

FIGS. 5A & 5B are partial cross-sectional views of the inflatable tube ski vehicle showing different means for attaching a bladder portion of the ski vehicle to a ski insert portion of the ski vehicle;

FIGS. 6A–6D are top and bottom plan views and front and side cross-sectional views, respectively, of the inflatable tube ski vehicle with an alternative ski insert.

DETAILED DESCRIPTION OF THE INVENTION

Figure 2:
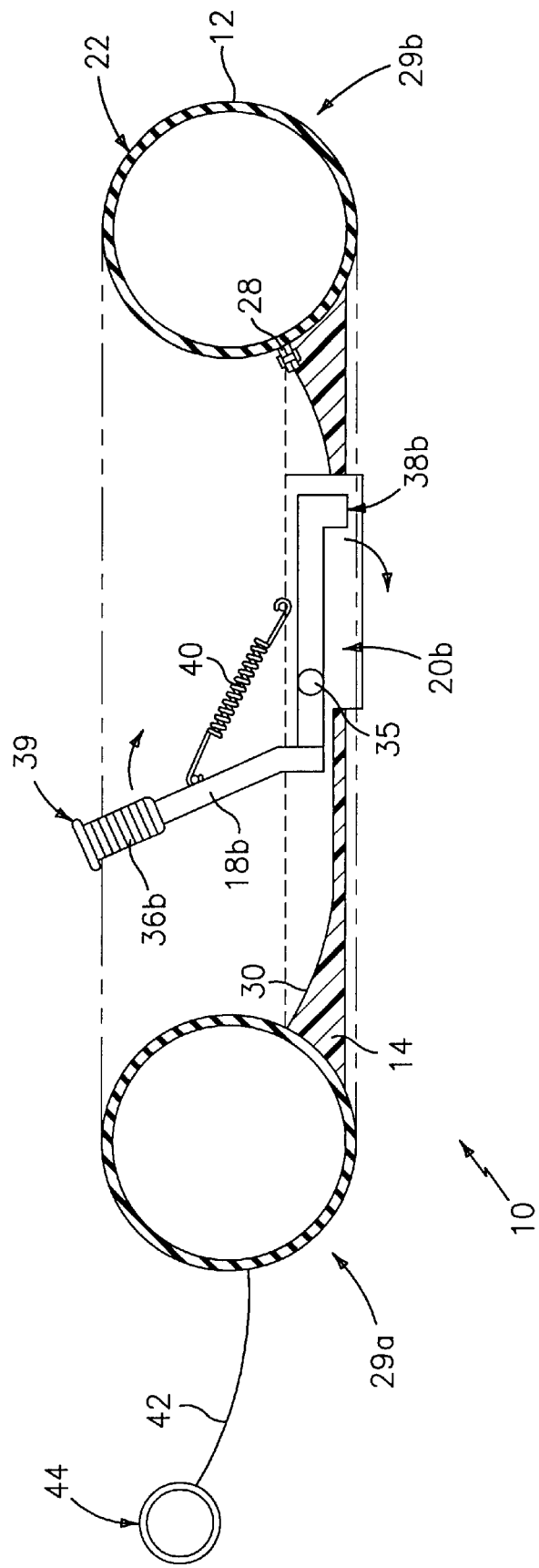
FIG. 2 is a side cross-sectional view of the inflatable tube ski vehicle.
Figure 3:
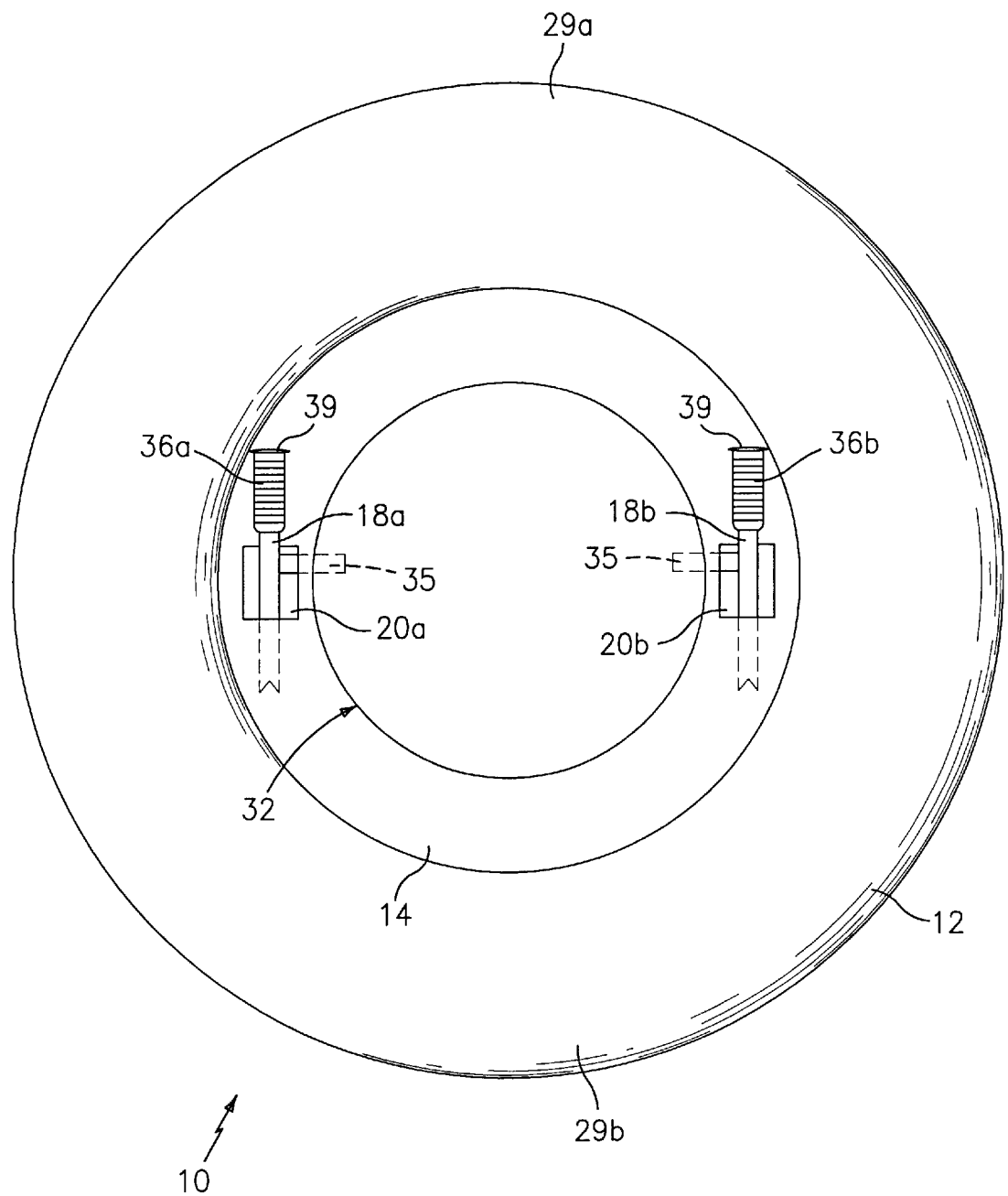
FIG. 3 is a top plan view of the inflatable tube ski vehicle.

With reference to FIGS. 1–6D, an inflatable tube ski vehicle with steering mechanism 10 comprises a standard, air-inflated, torus-shaped tube or bladder 12 and a ski insert 14 or 16 disposed in the central opening of the bladder. The ski insert can be a dish-shaped ski insert 14 attached to the underside of the bladder 12 and partially extending up into the bladder's central opening. Alternatively, a contoured ski insert 16 that partially wraps around the top and bottom of the bladder 12, as shown in FIGS. 6A–6D, may be used. In either case, the ski vehicle 10 is provided with a steering braking mechanism comprising left and right lever arms 18a, 18b pivotally attached to the ski insert 14, 16. The lever arms 18a, 18b respectively pass through left and right side openings or slots 20a, 20b that extend through the ski insert. To turn left or right, a rider simply pulls on the left or right lever arm 18a, 18b, respectively, causing a lower portion of the arm to extend into the snow. To brake, both arms 18a, 18b are pulled simultaneously. The harder the rider pulls on either lever arm alone (for steering), or both lever arms together (for braking), the more aggressively the ski vehicle turns or slows down, as applicable. Because the ski vehicle is round and the weight of the vehicle and rider are largely uniformly distributed over the center of the vehicle, and because the lever arms extend down through the central opening of the bladder, a pivot or fulcrum point occurs directly under the rider's seat, providing a significant degree of control.

FIGS. 1–5B show the inflatable tube ski vehicle 10 with the bladder 12 and dish-shaped (e.g., generally round and thin) ski insert 14. The bladder 12, as mentioned, is a standard, air-inflated, torus-shaped tube having a central opening or aperture. The bladder 12 gives the ski vehicle 10 a significant portion of its mass, which in turn provides anti-tipping stability. The bladder 12 also provides a comfortable support for the rider's body, and increases the vehicle's snow buoyancy and speed by providing the ski vehicle with a large, low friction footprint. The bladder 12 can be covered with a protective cover 22 (see FIG. 5B), and can be attached to the dish-shaped ski insert 14 via a plurality of straps 24 extending around the bladder 12 and through holes 26 provided in the ski insert 14 (see FIG. 5A), or via the cover 22 being affixed to the ski insert 14 via bolts 28 or the like. Once the ski insert 14 is affixed to the bladder 12, a front 29a and a rear 29b of the ski vehicle are effectively defined.

The dish-shaped ski insert 14 is round and has a generally flat bottom. It is made of polyethylene, polyvinyl chloride, polystyrene, or any other strong, light, thermoplastic or polymer material. The ski insert 14 can be injection molded, roto-molded, or otherwise, according to standard manufacturing methods. The ski insert 14 acts as a "keystone" by holding the operational parts of the ski vehicle together, and as a means for attaching the steering mechanism (lever arms 18a, 18b) to the bladder 12. The ski insert 14 also comprises a goodly portion of the ski vehicle's bottom, providing the vehicle with a low friction, buoyant sliding surface.

The ski insert 14 abuts the bottom area of the central opening of the bladder 12, and may come flush to the very bottom of the bladder 12; alternatively, it may lie slightly recessed within the confines of the bladder's central opening, as best seen in FIGS. 1 and 2. A concave top surface 30 of the ski insert 14 is provided with one or more cushions 32, and serves as a seat or cockpit. Also, the ski insert 14 has the two slots 20a, 20b disposed therein, on either side of the ski insert. The slots extend through the ski insert from top to bottom, and may have elongated, recessed bottom portions, as shown in FIGS. 2 and 6D, for accommodating the snow rakes and lower portions of the lever arms when retracted (as shown in FIG. 2).

Additionally, the generally flat underside of the ski insert is provided with two parallel runners 34 composed of metal, plastic, or any other hard material. The runners 34 are mounted to the center underside of the ski insert 14, and provide the ski vehicle with directional stability. More specifically, without the runners, the ski vehicle 10 would potentially slide and spin out of control. However, with the runners 34, once a rider chooses a path or direction of travel by using the lever arms 18a or 18b, the runners help ensure that the vehicle continues along that path without much further effort by the rider. The ski vehicle effectively steers itself until the rider again operates one of the lever arms 18a, 18b.

As mentioned, the ski vehicle 10 is provided with the steering/braking mechanism comprising the two lever arms 18a, 18b pivotally attached to the ski insert 14 and passing through the slots 20a, 20b in the ski insert 14. The lever arms are pivotally attached to the ski insert at their midpoints, or at some other point between the ends of the lever arms, by way of pivot shafts 35 or the like. The lever arms 18a, 18b are bent according to a modified L-shape, as best seen in FIGS. 2 and 6D. Upper ends of the lever arms 18a, 18b are provided with handles 36a, 36b, respectively, while lower ends of the arms, pivotal beyond the bottom of the ski insert 14, are provided with snow rakes 38a, 38b, e.g., contoured ends for engaging snow. The handles 36a, 36b may be contoured or provided with top discs or extensions 39 for preventing a rider's hands from slipping off the handles.

The lever arms 18a, 18b can be moved from a retracted position, as shown in FIG. 2, to a fully deployed position as shown in FIG. 1. When the arms are retracted, the snow rakes 38a, 38b lie generally tucked up into the slots 20a, 20b, with the handles 36a, 36b being located further towards the front of the vehicle. When deployed, as shown in FIG. 1, via a rider grasping the handles 36a, 36b and pulling rearwards, the snow rakes extend significantly beyond the bottom of the ski insert 14, so as to engage snow.

The lever arms 18a, 18b and associated snow rakes 38a, 38b are what give a rider operational control over the ski vehicle 10. When the lever arms 18a, 18b are pulled, the snow rakes 38a, 38b are forced into the snow, causing drag. The amount of drag is directly proportional to the amount of force applied to the lever(s), i.e., the harder the rider pulls on one of the levers, the more drag the ski vehicle experiences on that side. Because the ski vehicle is round in shape and the weight of the vehicle and rider are largely uniformly distributed over the center of the vehicle, and because the lever arms extend down through the bladder's central opening, a pivot or fulcrum point occurs directly under the rider's seat. When the rider delivers drag to the left or right side of the ski vehicle, by way of the lever arms 18a, 18b, the vehicle turns or pivots on its center, and the vehicle rotates in the direction of the drag (left or right). If the rider pulls back on both lever arms 18a, 18b at the same time, creating drag on both sides of the ski vehicle, the ski vehicle does not rotate or turn; rather, it simply slows down and/or stops. As should be appreciated, since the ski vehicle 10 pivots or turns over its center, a rider can make very tight turns, thereby achieving ski-like control.

To use the ski vehicle 10, a rider sits in the ski insert 14 and draped over the bladder 12, with the rider's legs extending over the front 29a of the vehicle, e.g., as if reclined in an easy chair or recliner. In this position, the bladder 12 supports the rider's legs and back, and the user can grasp the handles 36a, 36b and travel downhill. With the lever arms 18a, 18b in the retracted position, the snow rakes 38a, 38b do not interfere with passing snow, and the vehicle travels straight downhill, as facilitated by the runners 34. To turn, one of the arms 18a, 18b is deployed or partially deployed by pulling rearwards on the appropriate handle 36a or 36b. This causes the lower portion of the particular arm, including its snow rake 38a or 38b, to extend down into the snow, causing drag, and, thereby, the ski vehicle 10 to turn. The degree to which one of the arms 18a, 18b is pulled rearwards will determine the sharpness of the turn. To brake, the rider pulls rearwards on both handles, causing both snow rakes 38a, 38b to pivot downwards into the snow, and the vehicle to slow or stop.

As a safety precaution, the arms 18a, 18b may be provided with extension springs 40 (see FIG. 2), which tend to pull the arms slightly rearwards. This causes the snow rakes 38a, 38b to be normally partially extended, so that if the ski vehicle gets away from the rider (e.g., the rider falls off the vehicle), the vehicle will come to a stop by way of the springs 40 causing the snow rakes 38a, 38b to engage the passing snow. During use, the rider maintains a slight forward bias on the arms 18a, 18b, against the action of the springs 40, if the rider wants to travel at full speed.

Figure 4:
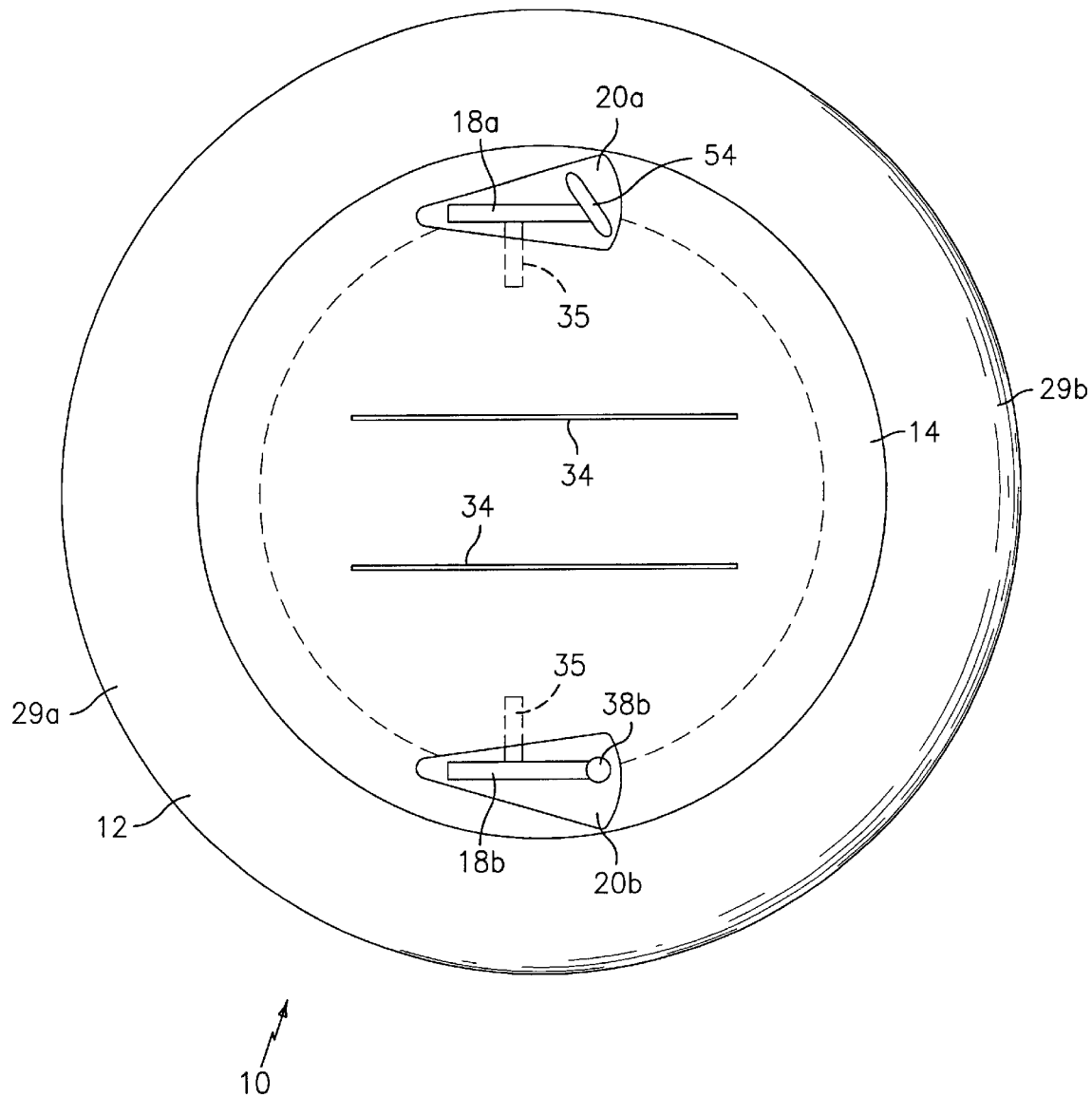
FIG. 4 is a bottom plan view of the inflatable tube ski vehicle.

The snow rakes 38a, 38b can be of many different designs, such as serrated rakes as shown in FIG. 1, or round or scoop-like rakes as shown in FIGS. 2 and 4.

As shown in FIGS. 2, 6A, 6B, and 6D, the ski vehicle 10 may be provided with a tow line or strap 42 and rubber ring 44 for facilitating towing the ski vehicle up a ski slope, behind a boat, or otherwise.

FIGS. 6A–6D show the inflatable tube ski vehicle 10 with the bladder 12 and the contoured ski insert 16. The contoured insert 16 will typically be hollow (for reducing weight), and can be made of any light, strong material, such as plastic, by way of conventional manufacturing processes. The contoured insert 16 performs the same function as the dish-shaped insert 14, and thus is generally similar to the dish-shaped insert 14, e.g., it defines a seat area 30, as well as the side openings or slots 20a, 20b.

Figure 6A:
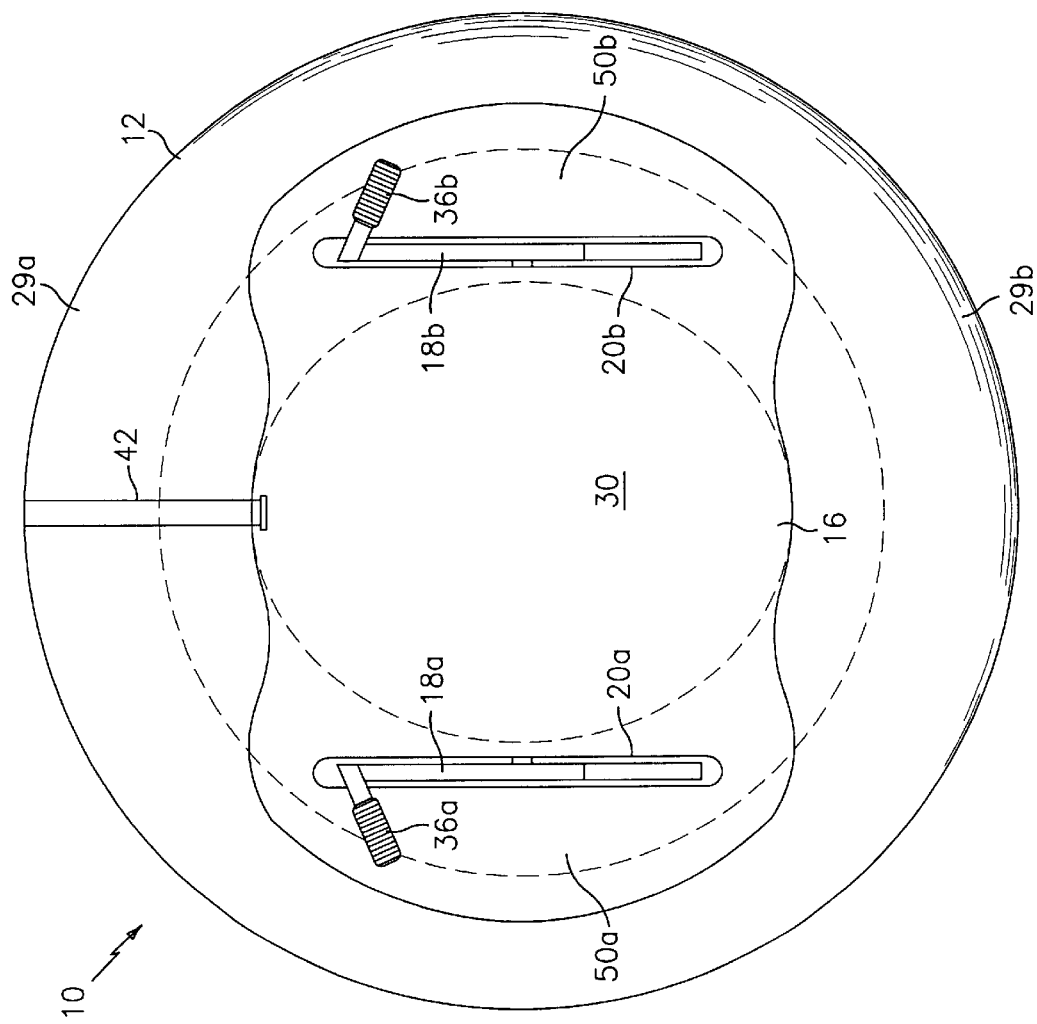

The contoured ski insert 16 comprises a round, generally flat bottom 46 that is flush with the bottom of the bladder 12, or slightly set back therefrom. From the bottom 46, the ski insert 16 extends up into the central opening of the bladder 12, generally conforming to the shape of the bladder 12. More specifically, the ski insert 16 has an annular, outwardly facing, concave side wall 48 that is shaped to fit against the bladder 12, as shown in FIGS. 6A and 6C. Additionally, instead of lying entirely within the confines of the bladder's central opening, the contoured insert 16 has two "wings" 50a, 50b that extend partially up over opposite top sides of the bladder 12. With the wings 50a, 50b, the side wall 48 effectively comprises forward and rear portions 51a, 51b that extend part-ways up the bladder 12, and left and right side portions 52a, 52b that extend up over the top of the bladder 12. In this manner, the bladder 12 is held in place against the side wall 48 by the wings 50a, 50b, and the contoured ski insert 16 effectively acts as a tire rim, with the bladder 12 becoming air locked to the contoured ski insert 16 when inflated. Thus, the bladder 12, with or without a cover 22, is connected to the ski insert 16 without the use of mechanical fasteners.

Figure 6B:
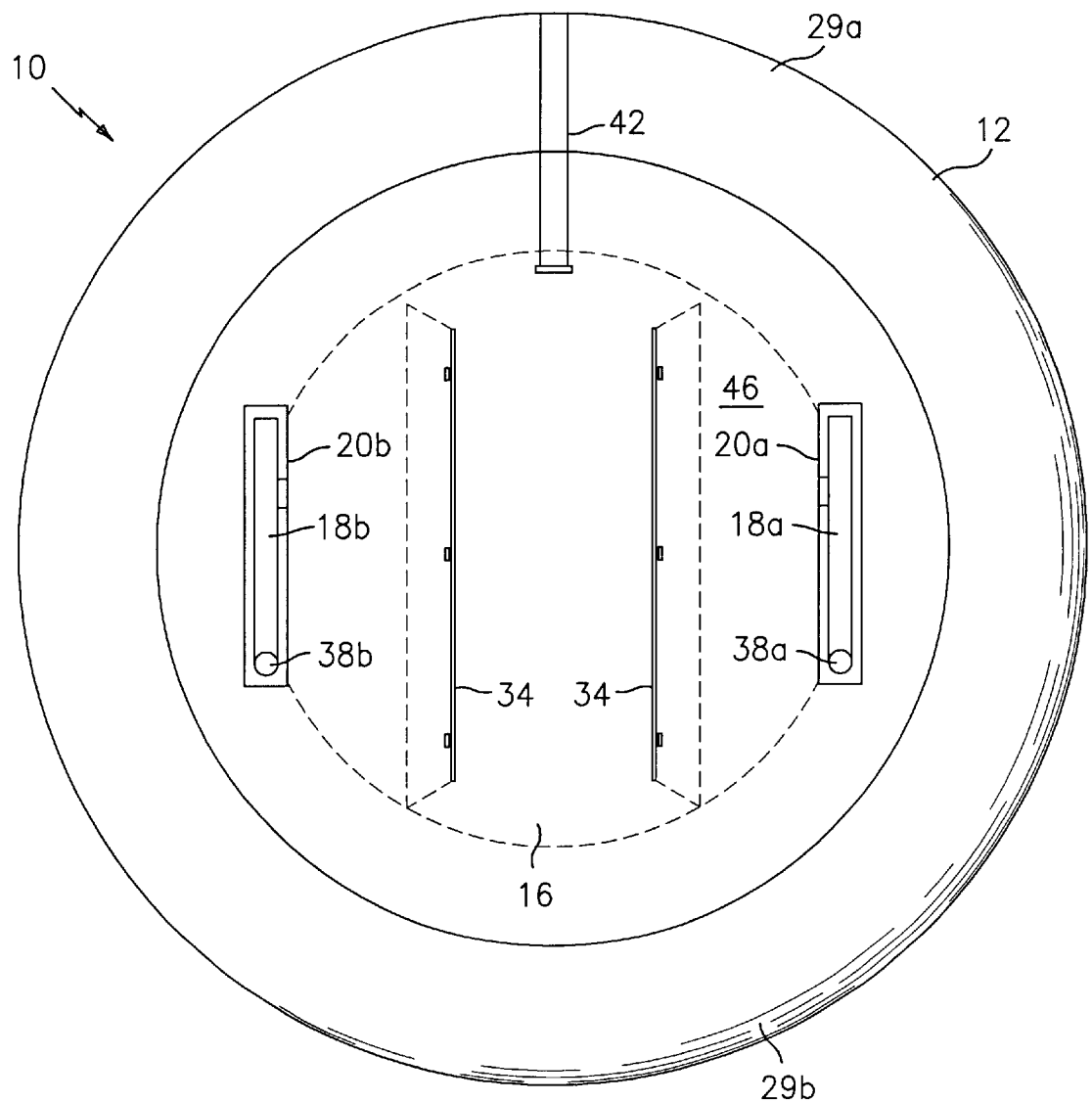
Figure 6C:
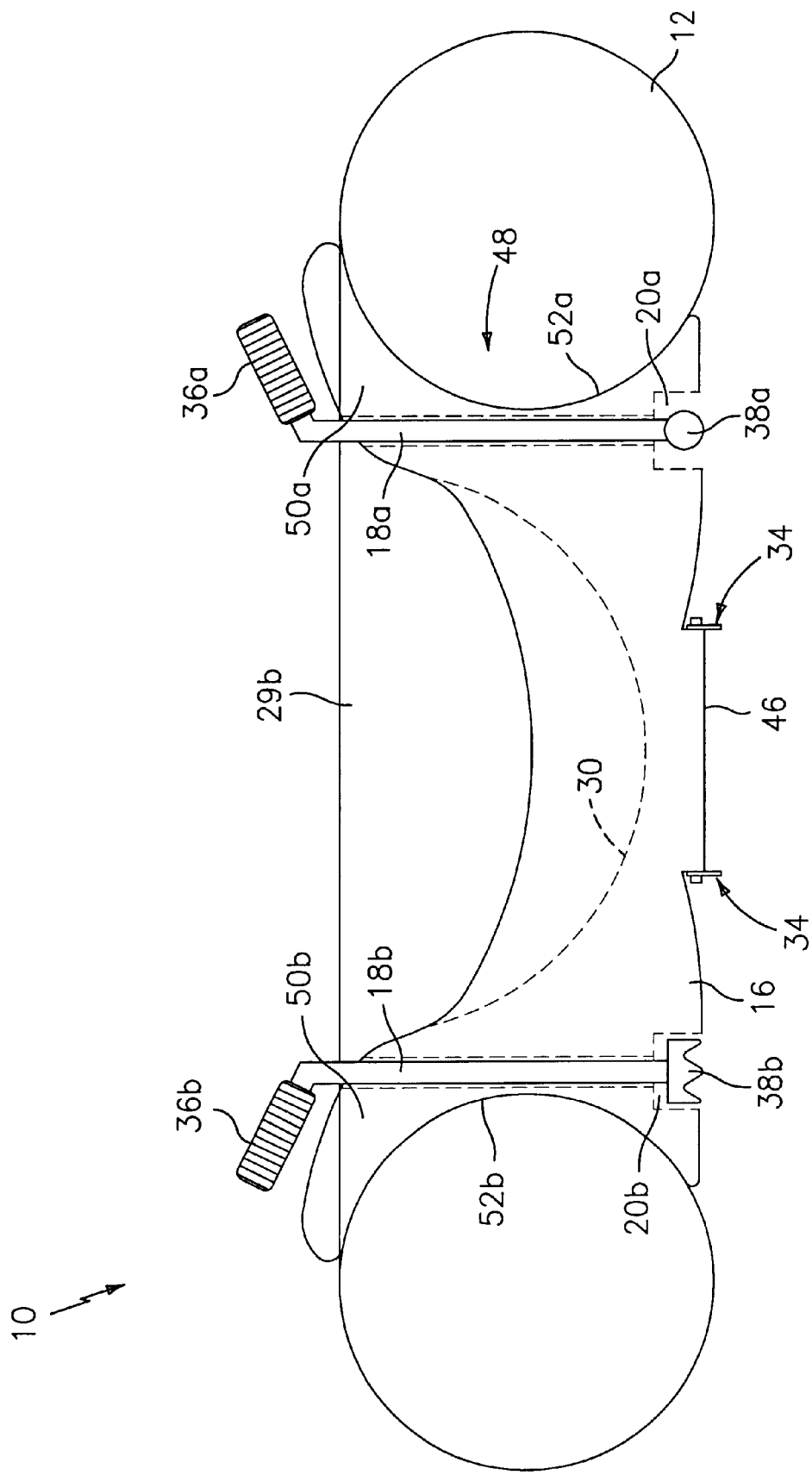

FIGS. 1, 6B, and 6C show how the runners 34 may be affixed to the ski inserts 14, 16. In particular, the runners 34 may be molded or press fit into the ski insert, as shown in FIG. 1, or they may be bolted to the ski insert, as shown in FIGS. 6B and 6C. For the latter, the ski insert may be provided with threaded female sockets (not shown) disposed in the ski insert at appropriate locations during, e.g., a molding process. Other conventional attachment means are also possible. Also, as shown in FIG. 6C, the bottom 46 of the ski insert may be contoured, concave-shaped, or otherwise, to accommodate the runners 34.

Since the ski vehicle is relatively light and includes the buoyant, inflated bladder 12, the ski vehicle 10 can be towed behind a boat or otherwise used in the water. For use in water, the tow line or strap 42 (or some other kind of tow harness) is attached to the vehicle, and the ski vehicle is towed behind a boat. The ski vehicle is the same as described above, except that instead of snow rakes 38a, 38b, the ends of the lever arms 18a, 18b are provided with steering fins 54, as shown in FIG. 4. When the vehicle is pulled behind a boat, the lever arms 18a, 18b can be used to steer the vehicle by appropriately extending or retracting the fins 50.

Figure 7:
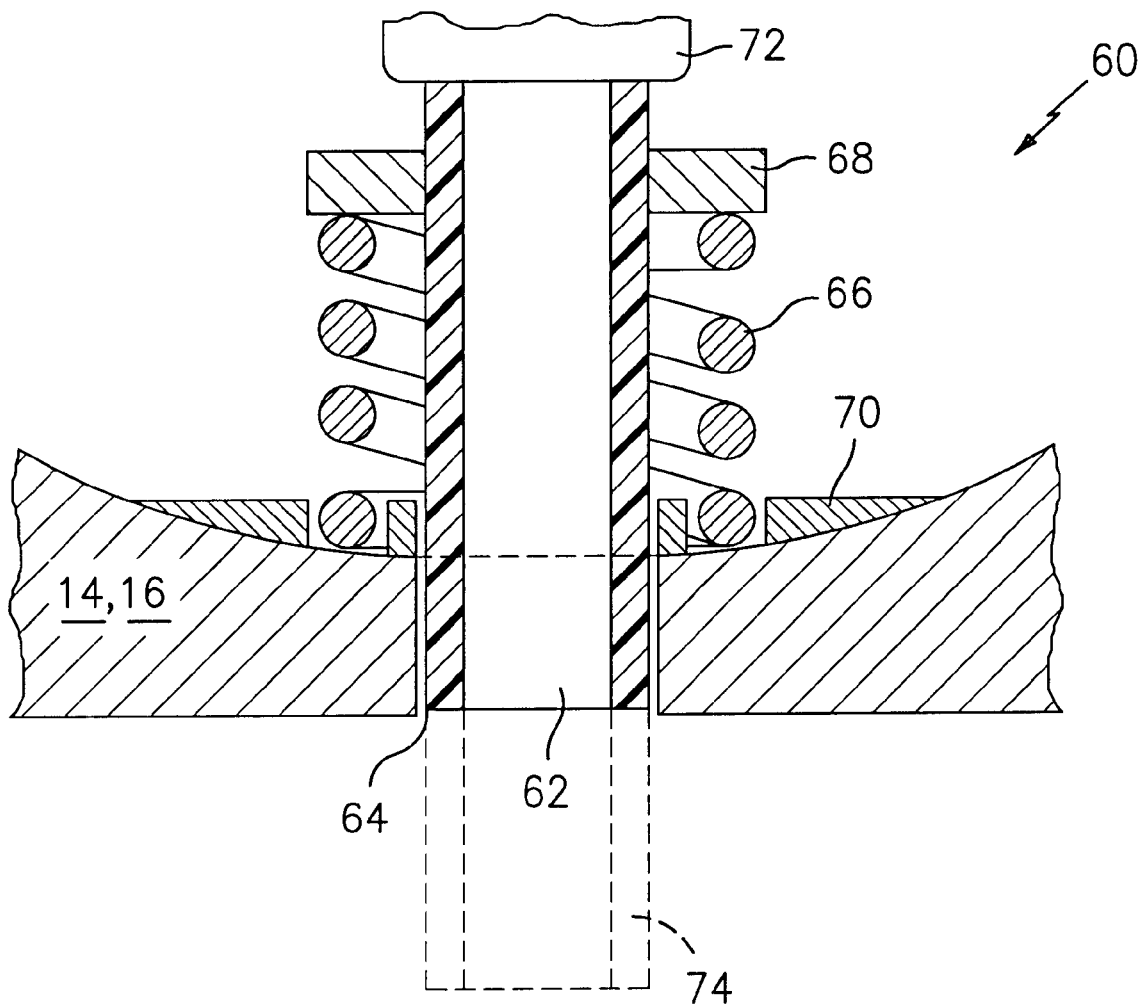
FIG. 7 is a cross-sectional view of an alternative steering mechanism.

While the ski vehicle 10 has been shown as having the two, generally L-shaped lever arms 18a, 18b pivotally attached to the ski insert 14, 16, other types of steering/braking arms could be used instead. FIG. 7, for example, shows a push-actuated lever arm 60. The push-actuated lever arm 60 comprises a shaft 62 disposed in an opening 64 provided in the ski insert 14, 16, and a compression spring 66 positioned concentrically over the shaft 62 and between the top of the ski insert 14, 16 and a retaining collar 68 attached to the shaft 62. The spring 66 may also be held in place by way of a retaining element 70 attached to the ski insert. The top end of the shaft 62 is provided with a handle 72. To use the push-actuated lever arms 60 for steering or braking (e.g., in a vehicle equipped with two of the push-actuated lever arms 60 in place of the pivoting lever arms 18a, 18b) a rider simply pushes down on one of the handles 72 for steering, and on both of the handles simultaneously for braking. More specifically, pushing down on the handle 72 causes the shaft 62 to extend beyond the bottom of the ski insert 14, 16, as indicated at position 74 in FIG. 7, which causes drag, and the ski vehicle to turn or slow down. As should be appreciated, the push-actuated lever arm 60 could be positioned at an angle with respect to the ski insert, instead of vertically as shown in FIG. 7.

Although the ski insert portions of the ski vehicle of the present invention have been illustrated as being made of thermoplastic or other polymers, one of ordinary skill in the art will appreciate that the ski inserts could be made of other materials instead, without departing from the spirit and scope of the invention. For example, the ski inserts could be made out of metal or wood.

Although the ski vehicle of the present invention has been illustrated as comprising a generally round bladder and ski insert, one of ordinary skill in the art will appreciate that the ski vehicle could be other shapes (e.g., triangular, square, longitudinal), without departing from the spirit and scope of the invention.

Although the ski vehicle of the present invention has been illustrated as having two parallel runners, one of ordinary skill in the art will appreciate that a single central runner could be provided instead without departing from the spirit and scope of the invention.

Since certain changes may be made in the above described inflatable tube ski vehicle with steering mechanism, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A ski vehicle comprising:
   a. an inflatable bladder having a central opening;
   b. a ski insert disposed in the central opening and having left and right side openings; and
   c. left and right lever arms pivotally attached to the ski insert and respectively extending through the left and right side openings, wherein the lever arms can be moved to a retracted position, wherein lower portions of the lever arms lie generally tucked up into the side openings, and to a deployed position, wherein the lower portions of the lever arms extend beyond a bottom of the ski insert; whereby for steering the ski vehicle, a rider moves one of the lever arms to its deployed position, such that the lower portion of the deployed lever extends beyond the bottom of the ski insert and interferes with passing snow or water, and whereby for braking, the rider moves both lever arms to their deployed positions, such that the lower portions of both lever arms extend beyond the bottom of the ski insert and interfere with passing snow or water.

2. The ski vehicle of claim 1 further comprising left and right snow rakes affixed to bottom ends of the left and right lever arms, respectively.

3. The ski vehicle of claim 1 wherein the left and right lever arms are each generally L-shaped, wherein in their retracted positions the lower portions of the lever arms lie generally tucked up into the side openings and generally parallel to the ski insert, with upper portions of the lever arms extending generally vertically up from a top of the ski insert, and wherein in their deployed positions the lower portions of the lever arms extend beyond the bottom of the ski insert, with the upper portions of the lever arms lying angled or generally parallel to the top of the ski insert.

4. The ski vehicle of claim 1 further comprising:
   a. a left extension spring disposed between and attached to the left lever arm and the ski insert; and
   b. a right extension spring disposed between and attached to the right lever arm and the ski insert, wherein the left and right extension springs bias the lever arms at partially deployed positions, such that the lower portions of the lever arms normally partially extend beyond the bottom of the ski insert.

5. The ski vehicle of claim 1 further comprising at least one runner attached to the bottom of the ski insert.

6. The ski vehicle of claim 1 wherein:
   a. the bladder is torus-shaped; and
   b. the ski insert comprises a round, generally flat-bottomed lower portion abutting the bladder and extending up through the central opening of the bladder to form left and right side wings, said wings extending partially over the top of the bladder and each defining an outwardly-facing, concave surface that fits against the bladder.

7. The ski vehicle of claim 1 wherein:
   a. the bladder is torus-shaped; and
   b. the ski insert comprises:
      i. a round, generally flat-bottomed lower portion abutting the bladder and extending up through the central opening of the bladder;
      ii. an upper portion extending up from the lower portion and having a contoured top surface configured for use as a seat; and
      iii. left and right side wings extending outwards from the upper portion and lower portion, said side wings extending partially over the top of the bladder and each defining an outwardly-facing, concave surface that fits against the bladder.

8. The ski vehicle of claim 1 wherein the ski insert comprises left and right wings defining generally opposite facing concave surfaces dimensioned and spaced apart from one another to hold the bladder, when inflated, against the ski insert.

9. The ski vehicle of claim 1 wherein:
   a. the bladder is torus-shaped; and
   b. the ski insert comprises:
      i. a round, generally flat bottom surface abutting a bottom of the bladder;
      ii. an outwardly-facing, annular, concave side surface extending up from the bottom surface of the ski insert and dimensioned to fit against the bladder when the bladder is inflated, said annular side surface comprising: front and rear portions extending part-ways up an inner side surface portion of the bladder; and left and right side portions extending up over the top of the bladder, wherein the left and right side portions of the annular, concave side surface are spaced apart from one another to hold the bladder, when inflated, against the ski insert; and
      iii. a concave top surface extending down from the annular, concave side surface to form a seat.

10. A ski vehicle comprising:
    a. an inflated bladder having a central opening;
    b. a ski insert disposed in the central opening and connected to the bladder;
    c. steering and braking means connected to the ski insert for steering and slowing the ski vehicle when traveling downhill or behind a boat in water; and
    d. brake safety means attached to the steering and braking means and to the ski insert, for causing the steering and braking means to slow down the ski vehicle unless counteracted upon by a user.

11. A ski vehicle comprising:
    a. an inflated bladder having a central opening;
    b. a ski insert disposed in the central opening and having first and second wings abutting opposite sides of the bladder and holding the bladder counterpoised against the ski insert, said ski insert also having first and second side openings disposed therein; and
    c. first and second lever arms pivotally attached to the ski insert and extending through the first and second side openings, respectively, wherein said first and second lever arms can be moved from a retracted position, wherein lower portions of the lever arms lie generally positioned within the openings, to a deployed position, wherein the lower portions of the lever arms extend significantly beyond the bottom of the ski insert.

12. The ski vehicle of claim 11 wherein the first and second lever arms are both generally L-shaped.

13. The ski vehicle of claim 11 further comprising first and second snow rakes attached to bottom ends of the first and second lever arms, respectively.

14. The ski vehicle of claim 11 further comprising: a first extension spring disposed between and connected to the first lever arm and the ski insert; and a second extension spring disposed between and connected to the second lever arm and the ski insert, wherein the first and second extension springs bias the lever arms in a partially deployed position, where the lower portions of the lever arms partially extend beyond the bottom of the ski insert.

15. The ski vehicle of claim 11 further comprising at least one runner attached to the bottom of the ski insert.

16. The ski vehicle of claim 11 wherein:
   a. the bladder is torus-shaped and the bottom of the ski insert is round and generally flat; and
   b. the ski insert comprises:
      i. the round, generally flat bottom;
      ii. a concave top surface; and
      iii. an outwardly facing, concave, annular side wall connecting the round, generally flat bottom to the concave top surface and abutting the bladder, wherein the side wall comprises front and rear portions extending part-ways up through the central opening of the bladder and left and right portions extending partially over the top of the bladder to form the wings.

17. The ski vehicle of claim 11 wherein:
   a. the bladder is torus-shaped and the bottom of the ski insert is round and generally flat; and
   b. the ski insert comprises:
      i. the round, generally flat bottom; and
      ii. the first and second wings, wherein the first and second wings extend up from the round, generally flat bottom, up through the central opening of the bladder, and over the top of the bladder, said first and second wings defining opposite outwardly facing, concave surfaces that abut the bladder.

18. A ski vehicle comprising:
   a. an inflatable bladder having a central aperture;
   b. a ski insert disposed in the central aperture of the bladder and having first and second openings extending therethrough; and
   c. first and second lever arms operably attached to the ski insert and extending through the central aperture of the bladder, said first and second lever arms being selectively actuable to extend lower portions of the first and second lever arms past the first and second openings, respectively, and beyond a bottom of the ski insert, whereby for steering the ski vehicle, one of the lever arms is actuated, and for braking, both lever arms are actuated simultaneously.

19. A ski vehicle comprising:
   a. an inflatable bladder having a central aperture;
   b. a ski insert positioned in the central aperture and abutting the bladder; and
   c. first and second lever arms pivotally attached to the ski insert and extending through the central aperture of the bladder, said first and second lever arms being selectively extendable past a bottom of the ski insert underneath the bladder.

20. A ski insert for use with an inflatable bladder as a ski vehicle, said ski insert comprising:
   a. a body having a top, a bottom, and first and second openings extending through the body, said body being dimensioned to fit within a central aperture portion of the inflatable bladder; and
   b. first and second lever arms pivotally attached to the body and respectively extending through the first and second openings, wherein the lever arms can be moved to a retracted position, wherein lower portions of the lever arms lie generally tucked up into the openings, and to a deployed position, wherein the lower portions of the lever arms extend beyond the bottom of the ski insert.

21. The ski insert of claim 20 further comprising:
   a. a first extension spring disposed between and attached to the first lever arm and the body; and
   b. a second extension spring disposed between and attached to the second lever arm and the ski insert, wherein the first and second extension springs bias the lever arms at partially deployed positions, such that the lower portions of the lever arms normally partially extend beyond the bottom of the ski insert.

22. The ski insert of claim 20 wherein the body is dimensioned to fit within the central aperture portion of an inflated torus-shaped bladder, and the body has an annular side wall configured to abut the inflated torus-shaped bladder.

23. The ski insert of claim 22 wherein the body includes first and second wing portions extending up from the bottom of the body, said wings each defining an outwardly facing, concave surface that is part of the annular side wall, said first and second wing portions being dimensioned to partially extend over the top of the inflated torus-shaped bladder.

24. A ski insert for use with a torus-shaped inflatable bladder as a ski vehicle, said ski insert comprising:
   a. a body dimensioned to fit within a central aperture portion of the torus-shaped inflatable bladder and having: a generally flat, round bottom; a top; and a concave, annular sidewall connecting the top and bottom, said side wall being dimensioned to fit against the bladder when the bladder is inflated; and
   b. first and second lever arms operably attached to the body and selectively extendable past the bottom of the body and through the bladder's central aperture when the body is positioned within the central aperture, wherein:
      the first lever arm has an upper portion and a lower portion, said first lever arm being operably attached to the body such that the upper portion of the first lever arm extends past the top of the body and can be actuated to cause the lower portion of the first lever arm to extend past the bottom of the body; and
      the second lever arm has an upper portion and a lower portion, said second lever arm being operably attached to the body such that the upper portion of the second lever arm extends past the top of the body and can be actuated to cause the lower portion of the second lever arm to extend past the bottom of the body.

25. The ski insert of claim 24 wherein:
   a. the body has first and second openings extending through the body; and b. the first and second lever arms are pivotally attached to the body and respectively extend through the first and second openings, wherein the upper portions of the lever arms can be actuated to cause the lower portions of the lever arms to lie generally tucked up into the openings, and wherein the upper portions of the lever arms can be actuated to cause the lower portions of the lever arms to extend past the bottom of the body.

26. A ski insert for use with an inflatable bladder as a ski vehicle, said ski insert comprising:

a. a body having a top and a bottom and dimensioned to fit within a central aperture portion of the inflatable bladder; and b. first and second lever arms pivotally attached to the body and selectively extendable past the bottom of the body and through the bladder's central aperture when the body is positioned within the central aperture.

* * * * *